A. DECKER.
SHOCK ABSORBER FOR VEHICLES.
APPLICATION FILED OCT. 17, 1912.

1,056,639.

Patented Mar. 18, 1913.

Witnesses
Edwin L. Bradford
M. D. Ballauf

Inventor
Alexander Decker,
By Wm S Dyre
Attorney

UNITED STATES PATENT OFFICE.

ALEXANDER DECKER, OF MONTGOMERY, PENNSYLVANIA.

SHOCK-ABSORBER FOR VEHICLES.

1,056,639. Specification of Letters Patent. Patented Mar. 18, 1913.

Application filed October 17, 1912. Serial No. 726,347.

*To all whom it may concern:*

Be it known that I, ALEXANDER DECKER, a citizen of the United States, residing at Montgomery, in the county of Lycoming and State of Pennsylvania, have invented certain new and useful Improvements in Shock-Absorbers for Vehicles; and I do hereby declare the following to be a full, clear, and exact description of the invention, such as will enable others skilled in the art to which it appertains to make and use the same.

My invention relates to carriages, wagons, automobiles and road vehicles in general, but more particularly to spring equipment of novel construction for use in connection with such vehicles.

It has for its object the production of means for absorbing the shock to which vehicles are continually subjected by inequalities of the road; also of anti-jolting means for cushioning the seat of the vehicle thereby adding materially to the comfort of its occupants; and also of relieving to a marked degree the undue and severe strains to which vehicles, and particularly heavy motor cars, are constantly subjected while in service.

With these and other objects and advantages in view, the invention will be hereinafter particularly described and pointed out in the appended claims.

Figure 1:
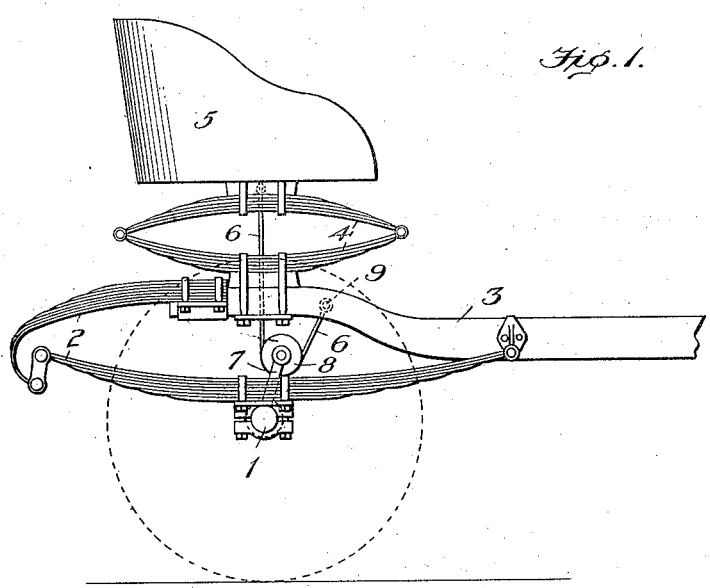
Figure 2:
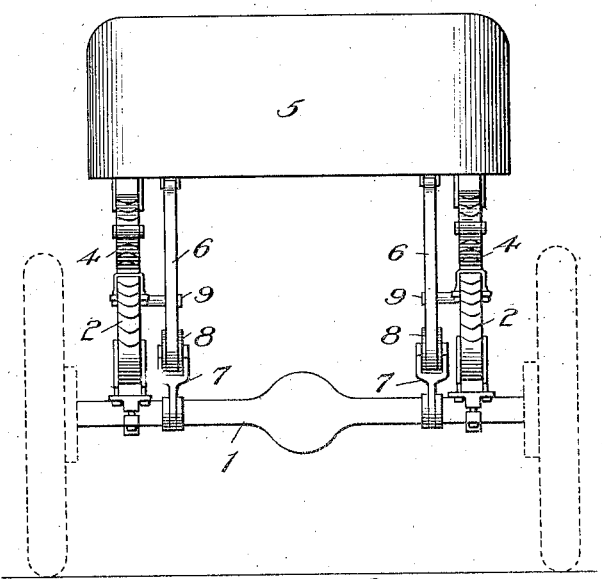

In the accompanying drawings which form part of this application for Letters-Patent, and whereon corresponding numerals indicate like parts in both views: Figure 1 is a side elevation of the spring equipment for one wheel of a vehicle, the wheel being indicated in dotted lines, and so much of the vehicle-frame and seat being shown as required to illustrate the relation of said parts, and Fig. 2 is a rear elevation of parts shown by Fig. 1.

Reference being had to the drawings and numerals thereon, 1 indicates the axle of a vehicle to which are clipped body springs 2 of any well known form of construction. Secured to springs 2 in any approved manner as shown, is a portion of the rigid vehicle frame 3, and clipped or otherwise attached to the latter are superimposed seat springs 4, in the present illustrations elliptical springs being shown, for example. Immediately over the last mentioned springs 4 is a vehicle seat 5 which in turn is fastened to these springs in the ordinary way, while depending from the under side of said seat is a pair of straps or other flexible connections 6, as shown by Figs. 1 and 2 of the drawings, and for purposes which will hereinafter appear.

Upon axle 1 just inside of and preferably between the body springs 2 are pivotally supported yokes 7 each bearing a flanged sheave pulley, or anti-friction guides, 8 over which straps 6 pass, to change their direction, and these straps are finally attached at their opposite ends to the vehicle frame 3 as at 9, thus operatively connecting the vehicle seat, axle and frame.

The foregoing being a description of one embodiment of my present invention, its operation as an anti-jolt and shock absorbing device may be briefly set forth as follows: The length of straps 6 and their points of attachment are so proportioned and arranged that seat-springs 4 are normally under an initial tension in excess of that required to support seat 5 and its occupant. If now inequalities in a road-bed are encountered a relative movement of axle 1 and the vehicle frame 3 will occur, if this movement be an approaching movement of said axle and frame it is quite obvious that the tension on straps 6 will be proportionately relieved, thereby permitting the seat springs 4 to expand more or less, and, as a consequence, to lift seat 5 with its occupants correspondingly thus counteracting all jolting or bumping tendencies. And, it will be further noted that the reverse action is equally true, if the relative movement, before referred to, between axle 1 and frame 3 be in opposite directions the straps 6 are automatically placed under increased tension which results in further compression of the seat springs 4 and a lowering more or less of seat 5 with its occupants to counteract a rise of frame 3 and the vehicle body.

The foregoing being a description of my invention in one form of embodiment, it should be understood that various structural changes and modified arrangements may be made and substituted for the parts herein shown and described, without in the least departing from the spirit of this invention, and to all such I lay claim, in so far as they involve means for imparting to seat springs and seats of vehicles a movement the reverse of that sustained by the frame and body of the vehicle in passing over inequalities in a road-bed. For example, the form, size, number and position of springs both body and seat springs is wholly immaterial, provided, only, that the seat springs are normally under an initial tension slightly in excess of, or in addition to, that applied through weight of the seat and its occupants. And in like manner the means of yieldingly connecting the tension strap 6 to the axle 1 may be changed to meet requirements of a large variety of vehicles. Moreover, the strap 6, or its equivalent, may be permanently attached at one end to axle 1 passing thence over a sheave or yielding connection beneath seat 5, and be finally secured at its opposite end directly to the vehicle frame 3 without altering the action of the spring equipment as hereinbefore set forth.

Having thus described my invention, what I now claim and desire to secure by Letters Patent is:

1. A seat for vehicles mounted upon springs normally under tension in excess of that required to support said seat and its occupants, in combination with means for automatically permitting a vertical movement of said seat in a direction the reverse of that imparted to the vehicle frame by inequalities in the road bed.

2. A seat for vehicles mounted upon springs normally under tension in excess of that required to support said seat and its occupants, in combination with means for operatively connecting the vehicle-seat axle and frame for automatically permitting a vertical movement of said seat in a direction the reverse of that imparted to the vehicle frame by inequalities in the road bed.

3. A seat for vehicles mounted upon springs normally under tension in excess of that required to support said seat and its occupants, in combination with a flexible connection between the vehicle-seat axle and frame for automatically permitting a vertical movement of said seat in a direction the reverse of that imparted to the vehicle frame by inequalities in the road bed.

4. In a vehicle the combination with its running-gear, of a seat mounted upon springs normally under tension in excess of that required to support said seat and its occupants, a flexible connection between said seat and the vehicle-frame, and an anti-friction guide carried by the vehicle axle over which the said flexible connection passes.

In testimony whereof I affix my signature, in presence of two subscribing witnesses.

ALEXANDER DECKER.

Witnesses:
 WILBER T. WELSHANS,
 MARY HALES.